July 31, 1962 D. H. HOWLING 3,047,761
RADIATION DETECTOR TUBES
Filed March 24, 1959 3 Sheets-Sheet 1

INVENTOR.
DENNIS H. HOWLING
BY
George H. Fritzinger
AGENT

INVENTOR.
DENNIS H. HOWLING
BY
George H. Fritzinger
AGENT

United States Patent Office 3,047,761
Patented July 31, 1962

3,047,761
RADIATION DETECTOR TUBES
Dennis H. Howling, West Orange, N.J., assignor to Mc-Graw-Edison Company, Elgin, Ill., a corporation of Delaware
Filed Mar. 24, 1959, Ser. No. 801,625
10 Claims. (Cl. 313—93)

This invention relates to new and improved radiation detector tubes and to their method of production. More particularly, the invention relates to improvements in D.C. type Geiger-Müller counter tubes which provide the tubes with a markedly superior performance, but the improvements of the invention have their maximum expression and utilization in a new form of A.C. operated detector tube and circuit which has a sensitivity, power output and stability far superior to those of any Geiger-Müller tubes heretofore known.

It is an object of the invention to provide new and improved radiation detector and/or counter tubes the electrode structures of which are refined to such a high degree as to enable the tubes to be manufactured within extremely close tolerances and to have a markedly better stability and life than the prior forms of such tubes.

Another object is to provide such new radiation detector tubes the electrodes of which have surfaces in a homogeneous state and with uniform spectral response and maximum work function.

Another object is to provide improved detector tubes which are capable of withstanding higher applied voltages and of delivering higher electric power and at greater efficiency than has been heretofore possible.

Another object is to provide highly sensitive radiation detector tubes which are free of localized electron emission such as would give rise to spurious counting, which have a low cosmic response of the order of only .1 count per minute at sea level, and which are truly solar blind in that they are substantially insensitive to incident radiation at wave lengths above about 2600 Angstrom units. A further object is to provide such tubes in a rugged structural form capable of withstanding vibration at 20 g acceleration from 5 to 2500 cycles per second.

An important object of the invention is to provide radiation detector tubes with refined electrode structures having only one permissible mode of operation, made possible by so fabricating the electrodes that they produce under an applied voltage a nearly homogeneous and maximum electrical field confined to the working region of the electrode structures. An important feature in these respects is in providing the electrodes with only uniform surfaces in the working region free not only of mechanical edges, projections and discontinuities but also free of all occluded gases and contaminating impurities which are normally resident in the electrode material up to approximately the melting temperature thereof. Moreover, the invention is characterized by identically treating both electrodes by chemical means, electro polishing, washing, heating, outgassing, purifying and ionic bombardment, that they are caused to have a homogeneous surface state at all incremental areas in the working region. This insures that each such surface area of both electrodes will have the same spectral response to incident ultraviolet energy and will have their maximum work function with well-nigh complete elimination of surface traps and with maximum probability of emission of an ionizing electron responsive to incident ultraviolet radiation especially at wave lengths below 2600 Angstrom units. A further refinement of the invention is in the use of an ultra pure ionizing gas as will appear.

The foregoing refinements make possible a radiation detector tube which can be operated directly from A.C. sources of voltage with very surprising improvements in power efficiency and output, simplicity of circuitry, etc. Preferably for A.C. operation there are used electrodes which have both mechanical and electrical symmetry permitting each electrode to operate equally well as cathode and anode. On A.C. operation automatic quenching is obtained at the end of each half cycle by the reversal of the applied voltage. An unusually high power efficiency of as much as 50% with continuous average power outputs of as much as 5 watts is made possible by working the tubes in relatively low impedance circuits and allowing the tubes to remain in the fully conducting state for the entire duration of that portion of each half cycle of applied voltage exceeding the striking and holding voltage of the tube. Such simplified quenching and high power output makes feasible the direct operation of power type control or indicating apparatus with the use of very simple operating circuits and without need of additional power amplification.

Other objects and features of the invention will be apparent from the following description and the appended claims.

In the description of the invention reference is had to the accompanying drawings, of which:

Figure 1:
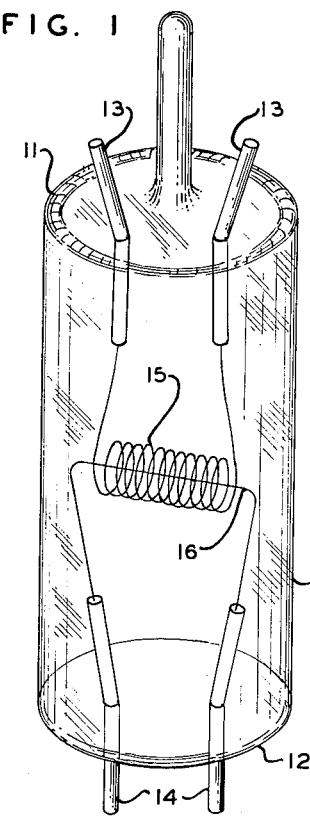
FIGURE 1 is a perspective view of an illustrative radiation detector tube, for example, of the D.C. Geiger-Müller type embodying features of the invention.

With reference to the embodiment shown in FIGURE 1, there is a glass envelope 10 sealed to base ends 11 and 12 having respective pairs of terminal pins 13 and 14 leading therethrough and extending into the envelope to form respective pairs of support rods for the electrodes. The upper pair of support rods have welded thereto the tails of a wire helix electrode 15 positioned crosswise of the envelope, and the lower pair of support rods have a generally U-shaped wire electrode 16 welded thereto with its active rectilinear crosswise portion extending axially through the helix 15.

The essence of the invention in its more fundamental respects resides in the fabricating technique and processing steps which are carried out to refine the electrode structure and adapt the tube to its high level of optimum performance.

Firstly, only electrode wire is used which is of uniform cross section, free of joins, scale, edges, projections, surface discontinuities or other defects. This wire is given a primary electro-polish in a sodium phosphate solution against a steel electrode, as when tungsten wire is used, to provide it with an ultra smooth bright finish. Next the wire is washed free of all traces of chemicals before it is formed into the desired configuration. Forming is done as by a jig or mandrel. Preferably, wire configurations are used wherein each wire element is doubly supported to provide a rugged structure capable of withstanding heavy vibration.

The base ends have terminal pins forming also support rods which are made of either Kovar or tungsten. If Kovar is used they are cleaned of oxide by boiling for about one minute in a 50% solution of hydrochloric acid and then immersed for a few minutes in a Kovar bright dip comprising about 750 ccs. acetic acid, 250 ccs. of concentrated nitric acid and 15 ccs. of concentrated hydrochloric acid. If tungsten pins are used oxides may be removed by electro polishing in a sodium phosphate solution.

In preferred embodiments of the invention the same material is used for both electrodes. Primary requirements for a tube having the efficiency, spectral response and handling power achieved by the invention is that the material shall be capable of being electro polished, have high mechanical strength at a high melting temperature and have a spectral response not substantially above about 2600 Angstrom units so that the tube will be essentially unresponsive to sunlight. Materials which theoretically meet the spectral response requirement are tungsten, platinum and rhenium. However, the only material of this group which can be refined to actually fulfill the spectral response requirement and also meet the other requirements as to strength, melting temperature and ease of electro polishing is tungsten. The high melting temperature, for example, of tungsten enables very efficient outgassing and surface preparation of this material. Tungsten is therefore a preferred material for the electrodes.

The electrode configurations are spot welded to suitable supporting rods. When supporting rods of Kovar and an electrode wire of tungsten are used, the assembly is cleaned of oxides after spotwelding by boiling the same in a dilute solution of hydrochloric acid and immersing agin in a Kovar bright dip. Next the assembly is washed in running water and given a secondary electro polish to remove final traces of oxides as well as local edges and projections at the weld points. The assembly is then again washed in running water and rinsed in distilled water, after which it is rinsed in a reagent grade methyl alcohol and dried in a dust free area so that no residual chemical contamination remains on the assembly.

When both the support rods and the electrode wire are of tungsten the assembly is cleaned after the welding process by first giving it a secondary electro-polish to remove oxides and welding point projections. If the welding is done in a hydrogen atmosphere—which however is not necessary—it is given also an electro-polish in orthophosphoric acid to remove residual copper deposited from the copper welding electrodes.

In all cases support rods of sufficient strength are used to provide adequate support of the electrode structure against vibration; however, the support rods are not to be so heavy that proper outgassing and conditioning thereof is prevented by excess thermal conduction of heat through the rods. When Kovar support rods are used, a tube base of Corning 7052 tube glass is preferred, and when tungsten support rods are used a glass of Corning 7720 or 7750 may be used. Kovar leads are easy to manipulate but must be relatively heavy—about 50 mils diameter—in order to carry a maximum current of 20 amperes needed as when the electrodes are treated by current heating. On the other hand, tungsten support rods of 50 mils diameter will carry up to 30 amperes current. Alternatively, the electrode structures may be heat treated by radio frequency induction. In this case the only requirement of the support rods is that they be capable of supporting the structure against vibration and yet allow the electrode structure, as when made of tungsten, to be heated in excess of 2000° C. without producing excessive thermal conduction down the support rods.

The envelope is made of a glass having good ultraviolet transmission such as quartz or Corning glass 9741. Before the envelope is sealed to the base it is washed in a detergent, rinsed, flushed with distilled water and dried, using a reagent grade methyl alcohol, and then it is baked in an oven at about 450° C. for about two hours. During sealing a forming gas is flowed over the electrode structure and support rods to prevent oxidation thereof.

The choice of wire diameter for the electrode structures depends upon the mechanical strength, current and sensitivity requirements, the sensitivity as well as the other properties increasing as the wire diameter is increased. Wire diameters between 1 mil and 30 mils are usable but diameters between 8 and 20 mils are preferred.

The tube is pumped out to a pressure of about $10^{-4}$ to $10^{-5}$ millimeters of mercury and is baked overnight at about 415° C., thereby reducing the pressure to about $10^{-8}$ millimeters of mercury. While the tube is still under the vacuum pump, the tungsten electrode structure is outgassed by heating the same to about 2250° C. The heating is first applied slowly, taking about 1 minute to bring the electrode structure to the desired temperature, and is then held at that temperature for about 15 seconds, after which the heat is lowered slightly and again raised to the desired temperature for another 15 seconds. Next the electrode structure is reduced back to room temperature over a period of about 1 minute. The evacuating system is then closed off and the tube filled with a pure gas to the desired pressure.

The gas filling is chosen with respect to the requirements as to quenching, striking voltage, ease of purification, insensitivity to cosmic radiation, etc. Although many gases and combinations of gases may be used, an ultra pure hydrogen gas having an impurity of only one part in $10^{10}$ is used. For example, hydrogen gas may be so purified as by a palladium filter. The gas pressure is made high enough to confine the discharge to the field—i.e., high work function—region of the electrodes. Gas pressures of hydrogen in the range between 3 and 10 centimeters of mercury are preferred, giving striking voltages in the range between about 400 and 650 volts.

During the heating of the electrode structure to outgas the same, impurities within the wire migrate to the surface and evaporate. A residue of low work function impurity, however, remains distributed over the wire surface. In order to raise the work function to the maximum the electrodes are next ion bombarded with positive hydrogen ions by the electron avalanche process for about 5 to 10 minutes. This is done by applying a D.C. or A.C. voltage to the tube electrodes through a series resistor chosen to limit the current to about 100 milliamperes, depending upon the size of the wire used. The impact of the positive ions drives off the surface impurities remaining after the heat treatment. It is essentially a sputtering process with driving of impurity atoms into the glass as a getter and preventing their return to the electrodes.

Tubes using tungsten refined by the processing steps above described have the unusual characteristic that they are well-nigh wholly unresponsive to ultraviolet radiation of wave lengths above about 2600 Angstrom units. This provides a well-nigh complete solar blindness. For instance, a solar blind test made by placing the tube within about 4 inches from an illuminated 100 watt bulb produces a count rate of about 50 per minute, indicating a solar count in direct sunlight of about 1 per minute. On the other hand, the sensitivity of the tube to ultraviolet light is such that upon bringing a match flame near the tube there is obtained a count rate of approximately 1000 per minute.

The effect of the many fabricating and processing steps above described are many fold: (1) the use of electrode structures having smooth uniform surfaces free of projecting edges, points, discontinuities, etc., to the ultimate degree is instrumental in producing homogeneous electric fields between the adjacent portions of the electrodes wherein there are no sharp variations in voltage gradient when a voltage is applied across the electrodes, with the advantage that localized field emission of electrons is prevented such as would give rise to spurious counts in the absence of incident ultraviolet radiation; and (2) the use of the same material in both electrodes and the refinement of these materials each to the ultimate by identical surface treatment as by electro-polishing, cleaning, heating and outgassing up to nearly the melting temperature of the material, and finally by ionic bombardment results in well-night completely homogeneous surfaces throughout the working region on both electrodes to provide them with their maximum work function, eliminates surface traps and provides each incremental surface area of both electrodes with the same spectral response to incident radiant ultraviolet flux. A joint result of these many improvements is to limit the tube to a single mode of operation, giving it an operational stability and reproducibility not heretofore possible. Moreover, these improvements enable the tubes to be driven to higher voltages, to have greater sensitivity, and to be operated into lower impedance circuits with a markedly higher power efficiency and output.

The improvements above described have their optimum utilization and practical benefit when the applied voltage is alternating current. On A.C. operation, quenching is achieved at each half cycle by the reversal of the applied voltage and not by the use of high external resistance as in the conventional Geiger-Müller tube. The load resistance can therefore be set at relatively low values typically about 15,000 ohms for maximum power efficiency and maximum power output. Unique also in this respect is the fact that the tube can be fully conductive during the entire portion of each half cycle. For example, any incident radiant flux when the applied voltage has exceeded the striking voltage such as will cause emission of an ionizing electron will produce an electron avalanche to switch the non-conducting tube into a sustained breakdown for the duration of the remainder of the voltage half cycle. The total power pulse output per emitted electron is consequently many times greater than that obtainable from the high resistance, externally quenched, conventional Geiger-Müller tube.

A feature of the invention for maximum performance on A.C. operation is to make both electrodes mechanically and electrically symmetrical so that each can function equally well as anode and cathode. This electrode symmetry enables the large power output per half cycle above described to be drawn during both halves of each voltage cycle. Thus, on A.C. operation an average continuous power output of as much as five watts at a 50% power efficiency has been obtained. The symmetrical structural design and processing procedure are unique in that they prevent the electrode surfaces from being disruptively modified at this high power level.

The choice of frequency of the applied voltage is arbitrary within wide ranges, but if very rapid counting is required higher frequencies should be employed. A common frequency range is from 60 to 400 c.p.s. The applied voltage is typically between 600 and 1200 volts peak value, a preferred operating voltage being of the order of 900 volts. Although voltages in excess of 1200 volts will not damage the tubes they may give rise to local field emissions causing self counting or multiple counting following a normal counting pulse.

Figure 2:
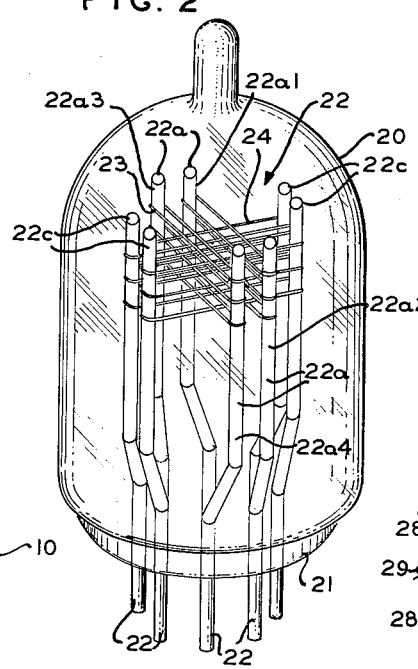
FIGURE 2 is a perspective view of a preferred form of radiation detector tube adapted especially for A.C. operations according to the invention.

In FIGURE 2 there is shown a radiation detector tube having a preferred form of symmetrical electrode configuration. This detector tube has a glass envelope 20 sealed at one end to a tube base 21 having terminal pins and support rods 22 extending therethrough of which there are eight such rods in an octagonal arrangement as viewed from the end of the tube. One set of two opposite pairs of these support rods—i.e., four in all referred to as 22a—have parallel wire elements 23 bridged thereacross of which there are four such parallel elements in each of three different parallel planes spaced at intervals along the support rods. Similarly, the other set of two opposite pairs of support rods 22c have parallel wire elements 24 bridged there-across of which there are likewise four such elements in each of three parallel planes interleaved with the first mentioned planes. Preferably, each electrode configuration is made from one continuous length of wire wound back and forth from one support rod to its opposite mate, to form successive elongated loops in the successive parallel planes above mentioned, there being thus three such loops bridged between the support rods $22a_1$ and $22a_2$, etc., and another three such loops bridged between support rods $22a_3$ and $22a_4$. The loops of electrode 23 thus cross the loops of the electrode 24 at a spacing therefrom within the central field region of the octagon defined by the support rods. Within this field region, therefore, there is a fully symmetrical arrangement of the electrodes to each other. By using the same material for both electrodes and applying the same treatment to both electrodes as before described each electrode is processed to operate equally well as cathode and anode. Also, the provision of only uniform electrode surfaces in the field region free of joins, edges, projections and discontinuities, and freed also to the ultimate of all occluded gases and impurities as well as being processed so as to have surfaces of uniform spectral response and maximum work function, results in a very stable reproducible tube having a high sensitivity and efficiency and a high power output especially on A.C. operation.

Figure 3:
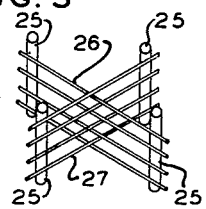
FIGURE 3 is an isometric view of an alternative form of electrode structure adapted especially for A.C. operation.
Figure 4:
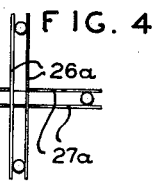
FIGURE 4 is a top plan view of a modification of the electrode arrangement shown in FIGURE 3.
Figure 5:
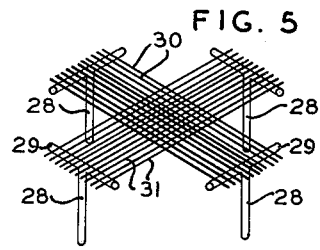
FIGURE 5 is an isometric view of another form of electrode configuration according to the invention.

In FIGURE 3 there is illustrated another symmetrical electrode configuration comprising four parallel support rods 25 positioned at the corners of a square as viewed from the end. Between opposite support rods there are bridged wire elements forming respective crossed electrodes 26 and 27. FIGURE 4 shows an end view of a modification of this arrangement wherein the individual wire elements are provided in pairs 26a and 27a instead of single elements as in FIGURE 3. FIGURE 5 illustrates another modification wherein there are four support rods 28 each of a T form positioned with their cross members 29 in a quadrangular arrangement. Bridged between one pair of opposite cross members is a series of parallel wire elements forming an electrode 30, and bridged between the second pair of cross members is a series of parallel wire elements forming a second electrode 31 having its central portion extending crosswise to and spaced from the adjacent portions of the other electrode.

Figure 6:
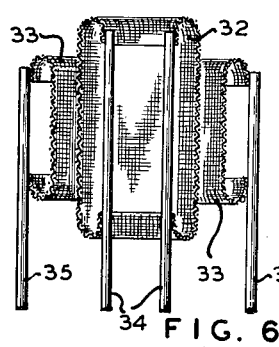
FIGURES 6 and 7 are side and end views of a concentric electrode configuration according to the invention of which the first is a section taken substantially on the line 6—6 of the latter.

In FIGURE 6 there is illustrated another symmetrical electrode configuration wherein a central cylindrical mesh electrode 32 is supported in concentric relation to an outer cylindrical mesh electrode 33. A feature of this construction is in curling the ends of each cylindrical mesh electrode away from the other electrode through approximately one half circle so as to remove the edge from the working field region between the electrodes and so satisfy the principle of single mode operation. In order to provide essentially equal confronting areas between the electrodes the outer one is made shorter than the inner one. Support rods 34 and 35 are joined as by spot welding to the curled edges of the respective electrodes at the sides thereof away from the working region.

Figure 7:
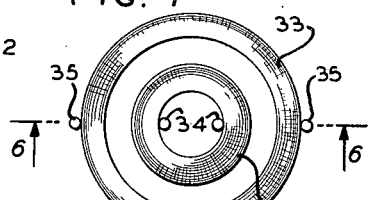

An end view of this electrode arrangement appears in FIGURE 7.

Figure 8:
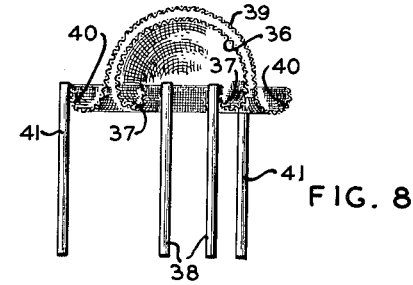
FIGURES 8 and 9 are side and end views of a dome type of electrode structure according to the invention of which the first is a section taken substantially on the line 8—8 of the latter.
Figure 9:
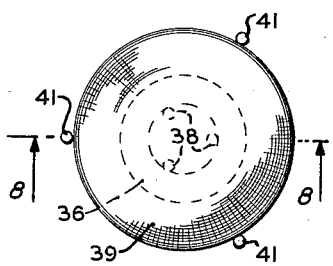

FIGURES 8 and 9 show a dome type of electrode configuration comprising an inner mesh electrode 36 of a dome or mushroom shape having its edge 37 curled inwardly and secured by welding to three equally spaced support rods 38. The other mesh electrode 39, also dome shaped, conforms to the inner electrode but has its rim 40 curled away therefrom through approximately a half circle and secured by welding to three equally spaced support rods 41. Each electrode may be a wire mesh of tungsten. An advantage of electrode constructions of this character is that a high sensitivity is obtained because of the large cathode area for any given overall size of tube, which large cathode area also provides for lower current density and greater power dissipation.

Figure 10:
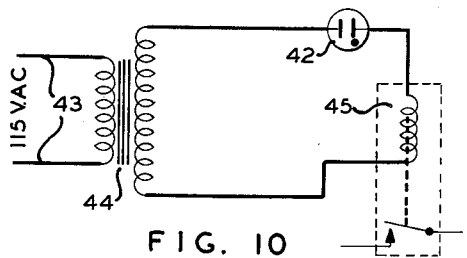
FIGURE 10 is a schematic drawing showing the tube and a circuit thereof adapted for A.C. operation.

In FIGURE 10 a detector tube 42 of the invention is shown connected to a 60 cycle, 115 volt line 43 through a voltage step-up transformer 44, the secondary circuit of which comprises simply the tube 42 and a load device 45 connected in series. The load device may be a resistance or impedance or both such, for example, as is constituted by the coil of a control relay. The voltage step-up by the input transformer is such as to provide a peak voltage across the tube and load of the order of 750 volts.

Figure 11:
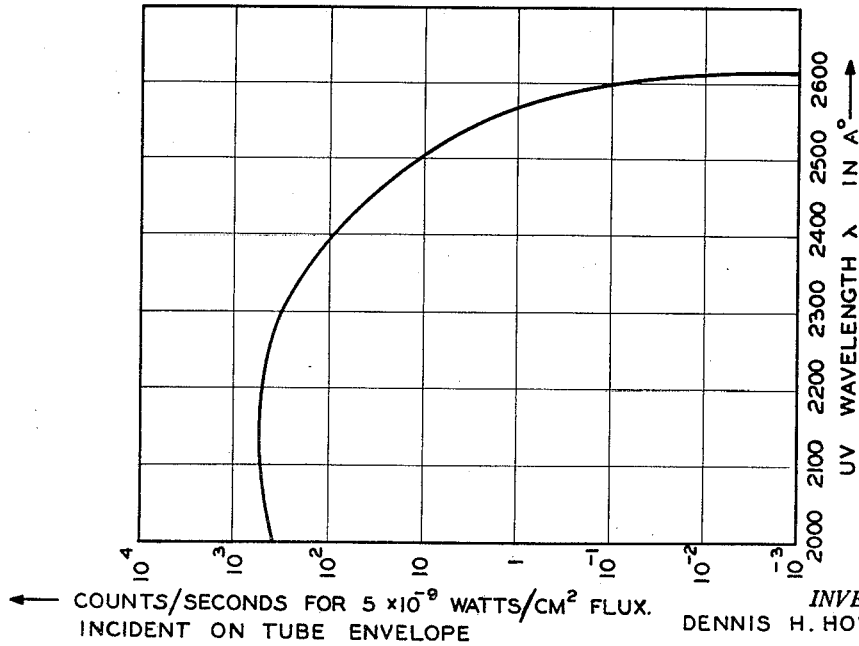
FIGURE 11 is an illustrative curve showing electric power output versus wave length of incident radiation for the present type of tube.

In FIGURE 11 there is shown a plot of the electrical output versus wave length of incident flux for a Geiger-Müller tube of the invention operated on a D.C. with a load of 100 megohms. The response is plotted in terms of the number of counts per second for an incident radiant flux of $5 \times 10^{-9}$ watts per centimeter squared, and the wave length is in Angstrom units. The curve shows that the response of the tube falls essentially to zero for incident flux of wave lengths above approximately 2600 Angstrom units. Thus the tube is well-nigh completely blind to solar radiation.

Figure 12:
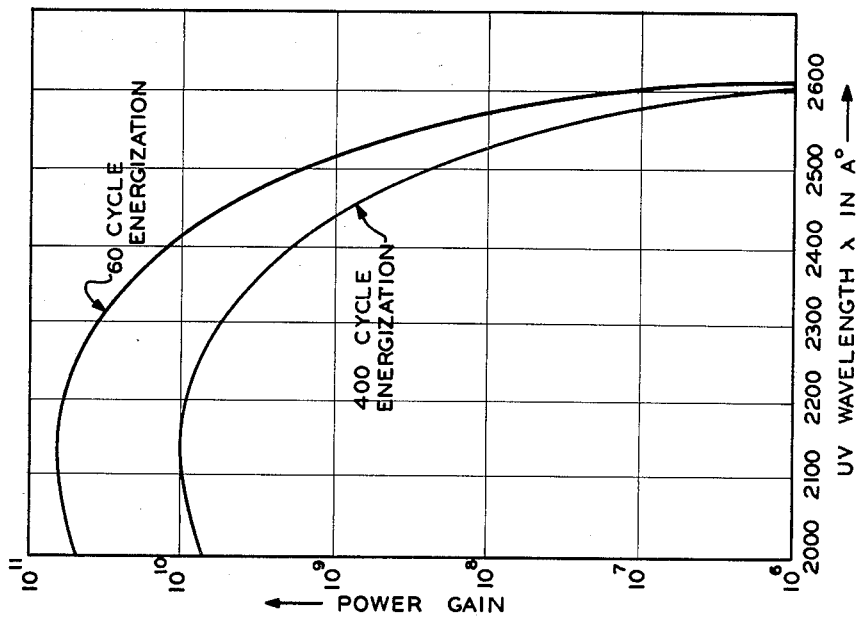
FIGURE 12 shows illustrative curves of power gain versus wave length of incident radiation on A.C. operation.

In FIGURE 12 there are shown curves of power gain versus wave length of incident radiation for A.C. operation at 60 and 400 cycles per second of applied voltage. The power gain is the ratio of the average power of the ultraviolet flux measured at the tube envelope to the continuous average electrical power delivered to the load. The results shown by the curves are those occurring when approximately 5 watts of average power are delivered to a load of 15,000 ohms. The total power of the incident flux to produce this output on 60 cycle operation is approximately $8 \times 10^{-11}$ watts, giving a power gain of approximately $6 \times 10^{-10}$. At 400 cycle energization the power of the incident flux to provide 5 watts of electrical power output is approximately $5.4 \times 10^{-10}$ watts, giving a maximum power gain of approximately $9.5 \times 10^9$.

Figure 13:
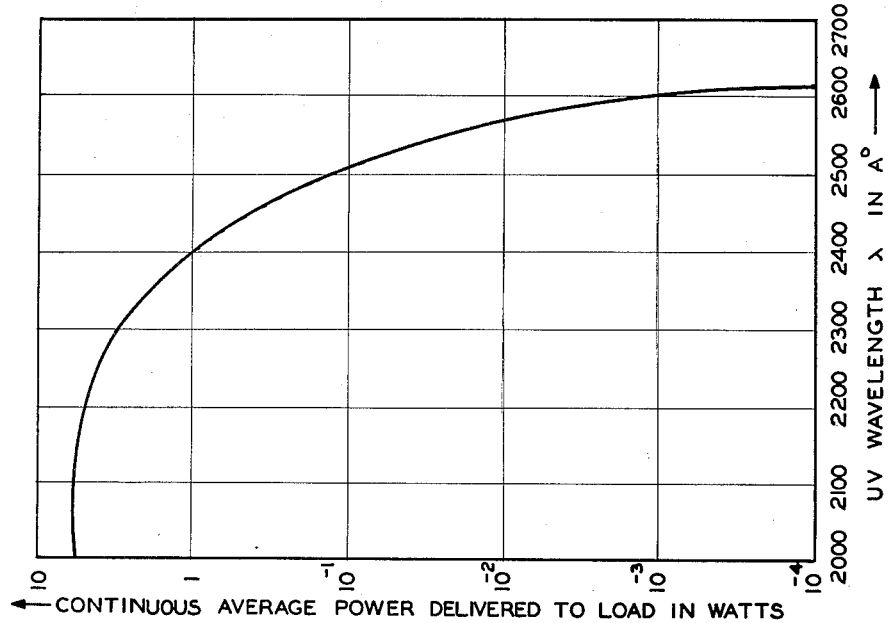
FIGURE 13 is a typical curve showing average electrical power output versus wave length of incident radiation when the applied voltage is 400 c.p.s. and the ultraviolet power input is constant at about $7.6 \times 10^{-9}$ watts.

In FIGURE 13 there is shown a curve of continuous average power output versus wave length of incident flux for a constant ultraviolet power input to the tube of $7.6 \times 10^{-9}$ watts per centimeter squared for 400 cycle energization or an equivalent of $1.1 \times 10^{-9}$ watts per centimeter squared for 60 cycle energization.

Figure 14:
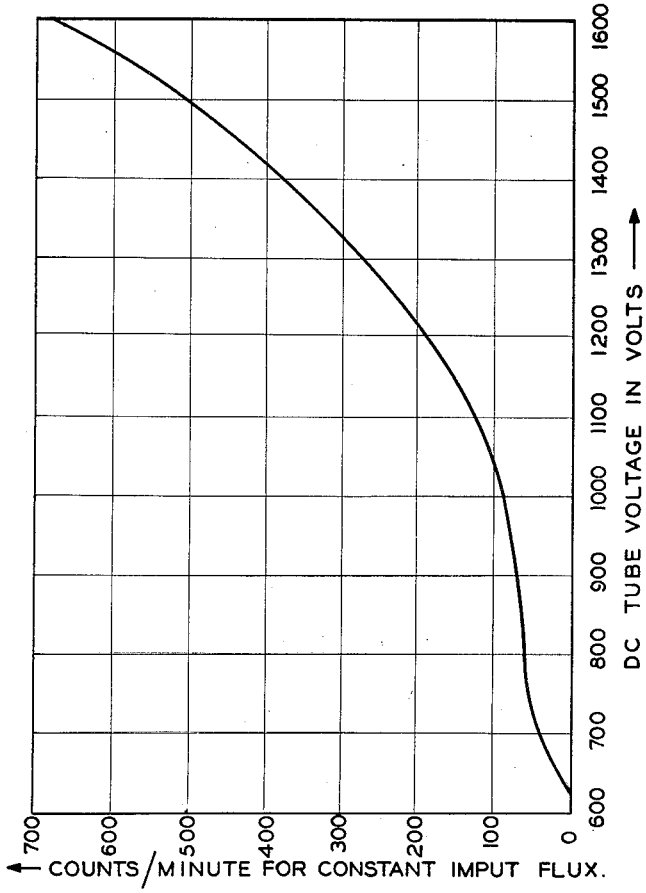
FIGURE 14 is a curve showing the counts per minute versus the D.C. applied voltage for a tube of the invention working into a 100 megohm load.

In FIGURE 14 there is a curve showing the counts per minute for a given input flux versus the D.C. voltage applied to the tube when working into a 100 megohm external load. The curve shows further that when stability of sensitivity is important the tube should be operated in the plateau range between 800 and 1000 volts.

The embodiments of my invention herein particularly shown and described are intended to be illustrative and not necessarily limitative of my invention since the same are subject to changes and modifications without departure from the scope of my invention, which I endeavor to express according to the following claims.

I clam:

1. A radiation detector tube comprising a pair of spaced electrodes, a gas tight radiation permeable envelope enclosing said electrodes, an ionizable gas in said envelope, means supporting said electrodes with a portion of each electrode adjacent to a corresponding portion of the other to provide a single integrated working region therebetween within which the emission of electrons by incident photons is capable of triggering an avalanche discharge between the electrodes when a firing potential is applied across the electrodes, said electrodes having smooth uniform surfaces free of contaminants to provide a uniform work function throughout said working region, and said electrodes comprising only wire elements each doubly supported out of said working region to avoid disturbing the electric field within the working region and to provide a rugged and vibration-free electrode structure.

2. The radiation detector tube set forth in claim 1 wherein said electrodes are made of the same material and have substantially the same configuration to enable the detector tube to have the same spectral response when either electrode is operated as anode or cathode, including an A.C. circuit connected to said electrodes serially including an A.C. source of potential and a utilization device responsive to alternating current flow through the detector tube when the tube is triggered by incident photons, said tube being quenched between the half cycles of applied voltage when the voltage falls below the sustaining potential for the tube.

3. The radiation detector tube set forth in claim, 2 wherein each electrode comprises a continuous length of wire having portions adjacent to each other forming said working region and having end portions extending away from each other to remove them effectively from said working region, and wherein said supporting means comprises support rods secured to said end portions of each wire out of said working region.

4. The radiation detector tube set forth in claim 2 wherein the electrodes are made of tungsten and the ionizing gas is substantially pure hydrogen.

5. The radiation detector tube set forth in claim 2 comprising two pairs of spaced parallel supporting rods wherein said electrodes comprise respective wires having intermediate parallel portions and end portions curving away from each other and secured to said supporting rods.

6. The radiation detector tube set forth in claim 2 wherein each electrode comprises a series of spaced parallel runs of wire with the runs of one electrode being crossed to and interleaved with respect to those of the other.

7. The radiation detector tube set forth in claim 2 wherein said electrodes comprise a plurality of loops of wire spaced uniformly from each other in directions at right angles to the planes of the loops.

8. The radiation detector tube set forth in claim 2 wherein each of said electrodes is in the form of a wire mesh having central portions in adjacent relationship to each other to provide a gas working region therebetween, and wherein each electrode mesh has its edges curled away from the other through approximately one-half circle to remove them effectively from the working region of the tube and to provide for a single mode operation between the electrodes.

9. The radiation detector tube set forth in claim 2 wherein said electrodes have cylindrical configurations in concentric relationship to each other, and wherein the outer one of said cylindrical electrode configurations has a substantially shorter length then the inner one.

10. The radiation detector tube set forth in claim 2 wherein said electrodes are dome-shaped structures one substantially within the other, the inner one of said dome-shaped structures having its edges curled inwardly through at least approximately one-half circle and the outer one of said dome-shaped structures having its edges curled outwardly away from the inner electrode, and wherein said detector tube includes support rods joined to said edges of said inner and outer electrodes.

(References on following page)

References Cited in the file of this patent

UNITED STATES PATENTS

| | | |
|---|---|---|
| 2,141,655 | Kott | Dec. 27, 1938 |
| 2,524,100 | Dauvillier et al. | Oct. 3, 1950 |
| 2,666,157 | Gleason | Jan. 12, 1954 |
| 2,715,195 | Friedman | Aug. 9, 1955 |
| 2,800,383 | Mitchell | July 23, 1957 |
| 2,844,433 | Meyer et al. | July 22, 1958 |
| 2,899,582 | Hermsen | Aug. 11, 1959 |
| 2,901,625 | Friedman et al. | Aug. 25, 1959 |
| 2,908,839 | Herzog | Oct. 13, 1959 |

FOREIGN PATENTS

| | | |
|---|---|---|
| 771,707 | Great Britain | Apr. 3, 1957 |

OTHER REFERENCES

Theory and Operation of Geiger-Müller Counters-I by Brown, Nucleonics, June, 1948, pages 10 to 22.

Geiger Counter Tubes, by Friedman, Proceedings of the I.R.E., Vol. 37, No. 7, July 1949, pages 791 to 808.

A Multiple-Wire Proportional Counter for Fast Neutron Detection, by Sun et al., Review of Scientific Instruments, Vol. 25, No. 7, July 1954, pages 691 to 694.